UNITED STATES PATENT OFFICE.

JONAS W. AYLSWORTH, OF EAST ORANGE, NEW JERSEY, ASSIGNOR OF ONE-HALF TO FRANK L. DYER, OF MONTCLAIR, NEW JERSEY.

NON-INFLAMMABLE LUBRICATING-OIL.

1,029,254.  Specification of Letters Patent. Patented June 11, 1912.
No Drawing.  Application filed October 14, 1910. Serial No. 587,044.

*To all whom it may concern:*

Be it known that I, JONAS W. AYLSWORTH, a citizen of the United States, and a resident of East Orange, in the county of Essex and State of New Jersey, have invented a certain new and useful Non-Inflammable Lubricating-Oil, of which the following is a description.

My invention relates to a lubricating agent which has the physical property of being non-inflammable or difficultly inflammable imparted to it, whereby the danger from fire in situations in which such lubricant is used is greatly minimized.

My object is to produce a lubricant having the desirable properties above referred to.

I have found that certain of the halogen substitution products of carbocyclic compounds form good lubricators when compounded with a suitable oil or grease and that they impart to the oil or grease a greater or less degree of inflammability varying with the percentage of the halogenized compound contained therein. The particular halogen substitution products which I find give the best lubricating effects are the various chlorin substitution products of napthalene, with the exception of the hepta and per chloro naphthalene. Other halogen substitution products of carbocyclic compounds which are of waxy or greasy texture, however, may be used with equally good results, but the greater cost of such products renders their use less desirable. The halogenized substitution products which I find best suited for the purpose have the halogen so firmly combined in the ring or closed chain of the compound that they are very stable and have no corrosive action on metals at temperatures considerably higher than that of boiling water.

The particular halogen which I find best suited for the purpose is chlorin, both on account of its low cost and the stability of its substitution products of the class herein described. The desired chlorin substitution products are produced by subjecting the carbocyclic compound, preferably naphthalene, to the action of chlorin gas while the compound is heated and under pressure until the desired degree of chlorination is attained, treating the product with an alkali, and distilling the product. The product may be further purified from traces of hydrochloric acid which are formed during distillation by treating the same with finely divided oxid or carbonate of lead and filtering, or by boiling, or washing with dilute alkali and washing with hot water.

The product, which may be any of the chloronaphthalenes below the hepta $$(C_{10}HCl_7),$$

is dissolved in the hot oil or grease to which it is desired to impart the property of being non-inflammable or difficultly so.

Examples of compositions of the character described are:—

(1.)

Machinery oil _____ 100 parts.
Tetra-chloro-naphthalene ____ 20 to 60 parts.
Mono-chloro-naphthalene ____ 20 to 60 parts.

This compound forms a medium machinery oil.

(2.)

Heavy cylinder oil _____ 100 parts.
Tetra-chloro-naphthalene ___ 50 to 100 parts.
Mono-chloro-naphthalene ___ 50 to 100 parts.

This forms an oil for heavy machinery.

(3.)

Mono-chloro-naphthalene ____ 100 parts.
Light paraffin oil _____ 20 to 50 parts.
Tetra- or tri-chloro-naphthalene _____ 20 to 50 parts.

This forms a light machinery oil.

(4.)

Heavy mineral oil _____ 50 parts.
Tetra-chloro-naphthalene ___ 50 to 100 parts.
Liquid chloro-naphthalene __ 10 to 35 parts.

The last cited mixture is made hot, whereby a perfect solution of the ingredients takes place. The mixture is allowed to cool and part of the chloro-naphthalene crystallizes out as soft waxy crystals which are mashed up into a uniform paste in a suitable mill. This composition forms a grease suitable for very heavy machinery and car axles.

(5.) *For a non-fluid oil.*

Medium machinery oil _____ 50 parts.
Liquid chloro-naphthalene ___ 50 parts.
Tetra-chloro-naphthalene ____ 50 parts.
Calcium stearate _____ 5 to 10 parts.

Machinery oil; medium machinery oil and heavy mineral oil are trade terms employed to designate light, medium and heavy hydrocarbon lubricating oils respectively.

Having now described my invention, what I claim and desire to protect by Letters Patent is as follows:—

1. As a new composition of matter, a lubricant comprising a lubricating oil having dissolved therein a halogen substitution product of a carbocyclic compound in which the halogen is in the ring or closed chain, substantially as described.

2. As a new composition of matter, a lubricant comprising a lubricating oil having dissolved therein a chlorin substitution product of a carbocyclic compound in which the chlorin is in the ring or closed chain, substantially as described.

3. As a new composition of matter, a lubricant comprising a lubricating oil having dissolved therein a halogen substitution product of a carbocyclic compound having lubricating properties, substantially as described.

4. As a new composition of matter, a lubricant comprising a lubricating oil having dissolved therein a chlorin substitution product of a carbocyclic compound having lubricating properties, substantially as described.

5. As a new composition of matter, a lubricant comprising a lubricating oil having dissolved therein a halogen substitution product of a carbocyclic compound of waxy texture, substantially as described.

6. As a new composition of matter, a lubricant comprising a lubricating oil having dissolved therein a chlorin substitution product of a carbocyclic compound of waxy texture, substantially as described.

7. As a new composition of matter, a lubricant comprising a lubricating oil having dissolved therein a halogen substitution product of a carbocyclic compound which is non-corrosive to metals, substantially as described.

8. As a new composition of matter, a lubricant comprising a lubricating oil having dissolved therein a chlorin substitution product of a carbocyclic compound which is non-corrosive to metals, substantially as described.

9. As a new composition of matter, a lubricating oil having a halogen substitution product of naphthalene dissolved therein, substantially as described.

10. As a new composition of matter, a lubricating oil having a chlorin substitution product of naphthalene dissolved therein, substantially as described.

11. As a new composition of matter, a lubricating oil having a chlorin substitution product of naphthalene, of a degree of chlorination lower than hepta-chloro-naphthalene, dissolved therein, substantially as described.

12. As a new composition of matter, a composition comprising lubricating oil and tetra- and mono-chloro-naphthalene, substantially as described.

This specification signed and witnessed this 8th day of October 1910.

JONAS W. AYLSWORTH.

Witnesses:
 DYER SMITH,
 ANNA R. KLEHM.